Sept. 21, 1965          H. BAUER          3,207,081
AUTOMATIC SYSTEM FOR FLUIDTIGHTLY HOLDING THE VALVE-CARRYING
HEAD ON A PISTON-OPERATED MACHINE SUBJECTED
TO HIGH PRESSURES
Filed April 12, 1963          2 Sheets-Sheet 1

Inventor
   Helmut Bauer
By
Wenderoth, Lind & Ponack
     Attorneys

United States Patent Office 3,207,081
Patented Sept. 21, 1965

3,207,081
AUTOMATIC SYSTEM FOR FLUIDTIGHTLY HOLDING THE VALVE-CARRYING HEAD ON A PISTON-OPERATED MACHINE SUBJECTED TO HIGH PRESSURES
Helmut Bauer, Basel, Switzerland, assignor to Maschinenfabrik Burckhardt A.G., Basel, Switzerland, a Swiss company
Filed Apr. 12, 1963, Ser. No. 272,743
Claims priority, application Switzerland, Apr. 24, 1962, 4,902/62
4 Claims. (Cl. 103—153)

In the case of pumps and compressors subjected to high pressures, it is considered as necessary not to provide a cylinder made of a single part but to facilitate production and to reduce the risk of fatigue failure by manufacturing the actual cylinder and the valve-carrying head as separate parts.

In order to provide for fluidtightness of the valve-carrying head with reference to the cylinder body, very large forces are required and the usual structures including a flanged connection are no longer of practical use under very high pressure conditions. It is necessary to use extremely large screws which are tightened with a very high initial stress and it is a difficult matter to provide a housing for such large screws. The tightening of such screws requires a very large expenditure of energy and, lastly, it is possible only with difficulty to tighten all the screws in a uniform and accurate manner with the desired initial stress.

To remove these difficulties, arrangements have been provided which allow tightening the screws through application of the hydraulic pressure produced by a special pressure pump, so that the expenditure of force is reduced, and a uniform tensioning to the desired extent is obtained.

The present invention has for its object a better solution of said problem and this is obtained through the fact that the sealing force required under the prevailing pressure conditions is obtained automatically during operation of the machine.

To this end, the invention consists in providing a piston-operated machine subjected to high pressures with an arrangement for the automatic application of the valve-carrying head under the action of the operative pressure in a manner such that the sealing diameter on the compressing piston is sufficiently large with reference to the diameter of the valve-carrying head for the sealing force to be proportional to the operative pressure.

Figure 1:
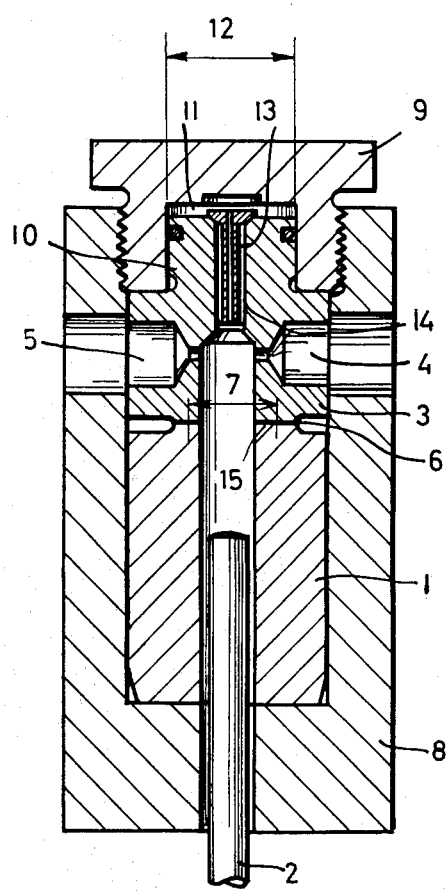
Figure 2:
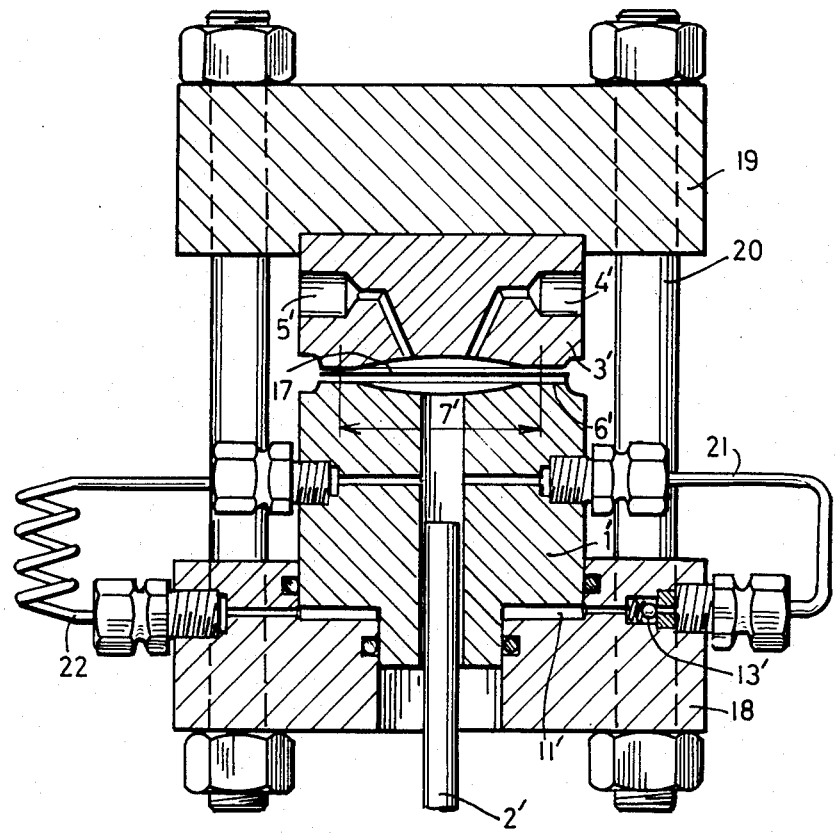

In the accompanying drawings:

FIGURE 1 is a cross-sectional view illustrating diagrammatically one form of the invention, and FIGURE 2 is a similar view showing diagrammatically a modification thereof.

Inside the cylinder 1 of the piston-operated machine which may be a high pressure compressor or pump, there moves a plunger 2 which is sealed through the usual means which are not illustrated. On the cylinder 1 is fitted a valve-carrying head 3 provided with transverse bores 4 and 5 for suction and delivery valves which are not illustrated. The valve-carrying head 3 is urged over the narrow contact surface 6 onto the cylinder 1 and is held fluidtightly thereon, fluidtightness being ensured along the medial diameter 7.

The cylinder 1 and the valve-carrying head 3 are held together inside an outer frame 8 which is closed at its upper end by the plug 9. A slight tightening of the closing member or plug 9 provides a reduced preliminary tensioning of the parts over the sealing surface 6, which tensioning is sufficient for starting purposes.

Inside the plug 9 is housed a piston 10 connected with the valve-carrying head 3 and allowing the driving medium to enter the chamber 11 through a central bore.

The chamber 11 which is illustrated for sake of clarity on an increased scale is obviously made as small as possible so as not to increase the dead space of the compressor. The pressure in the chamber 11 urges the piston 10 and the valve-carrying head 3 downwardly and provides thereby the sealing of the valve-carrying head 3 over the joint at 6. Since the diameter 12 of the compressing piston is larger than the sealing diameter 7, there is obtained a further sealing force which closes the joint 6, said force being proportional at every moment to the operative pressure in the machine. A suitable size given to the diameter of the piston 10 defines the value of said sealing force and it is an easy matter to provide a sealing force sufficient for obtaining a reliable sealing of the joint 6. However, this force will never be so large that it may rise above the compressive strength of the material at this point.

When assembling a machine incorporating such an arrangement, it is sufficient to tighten slightly the plug 9, whereby the machine is then immediately ready for operation, since the force required for application of the valve-carrying head is obtained automatically through the operative pressure in the machine.

If the chamber 11 were permanently connected with the inside of the cylinder, the force applying the head on the cylinder body during a cycle of operation would vary with the operative pressure inside the machine. These pressures of a highly fluctuating character would then be transmitted through the frame 8 and the closing plug 9 and these parts would then be subjected to a substantial risk of fatigue failure under the action of such a heavily pulsating load. This is avoided by providing a non-return valve 13 fitted inside the piston 10. This non-return valve prevents any return of the liquid flowing out of the chamber 11 into the cylinder chamber during the execution of a suction stroke in the cylinder. The chamber 11 is therefore subjected to a constant pressure which is automatically equal to the maximum pressure to be considered during the operation of the machine. Since the pressure in the chamber 11 is constant, the force to be transmitted through the frame 8, the closing plug 9 and its thread is also constant, which excludes fatigue failure.

A piston-operated machine provided with such an arrangement could thus be started operating after a slight tightening of the closing plug 9. The head-applying pressure required would be automatically transmitted to the joint 6 as soon as pressure has risen inside the machine and the pressure in the chamber 11 would correspond to the terminal pressure in the machine. If, during operation, the operative pressure increases, the pressure in the chamber 11 would automatically rise by the required amount.

If, however, during operation, the operative pressure in the machine is reduced, the pressure in the chamber 11 would remain unnecessarily at its upper level, which is no longer required and the pressure applied to the joint 6 to be sealed would therefore remain unnecessarily large. A further drawback would consist in such a case that, after the machine has stopped, the maximum pressure would still prevail in the chamber 11 and, consequently, the threads of the closing member 9 would remain in a tightened condition and it would not be possible to relieve said threads when dismantling the machine. It is therefore necessary to provide auxiliary means which allow reducing the pressure in the chamber 11 whereby it may be possible to reduce the pressure in the chamber 11 and to dismantle the machine.

This difficulty can be removed by a further novel feature: a long and narrow bore 14 allows the pressure in the chamber 11 to be slowly relieved by the fluid flowing back into the cylinder chamber. The bore 14 in the non-return valve 13 is so narrow and so long that the emptying of the chamber 11 requires a time much longer than one cycle of operation of the machine. This results in that, during one cycle of operation, the pressure inside the chamber 11 cannot be lowered by a substantial extent and that the reaction force transmitted through the frame 8, the closing plug 9 and its thread, remains practically constant. This results in that, upon stopping of the machine, the pressure inside the chamber disappears slowly, so that, a few minutes after the end of operation of the machine, the closing plug 9 can be released without any exaggerated force being required.

Instead of resorting to the frame 8 illustrated in the drawing, which is provided with a closing plug screwed into the cylinder body, it is also possible to provide a frame to which the closing member is secured through a flanged connection. It is also possible to transmit the forces without any frame, provided the cylinder 1 and the valve head 3 are held fast between two powerful flanges held together by tie rods.

It is not essential for the compression piston 10 to be arranged as illustrated over the valve-carrying head 3. It may, as well, be located underneath the cylinder 1 or at any other suitable point. In all such cases, it is possible to use an annular piston instead of a solid cylindrical piston.

Lastly, it may be of advantage to form the long and narrow bore 14, adapted to empty the chamber 11 in a protracted manner, by other means. The desired throttling of the return flow can be obtained for instance by a suitably wound elongated capillary tube, or else, it is possible to resort to a very long plug of porous material opposing the passage of the gases to the desired extent. The elongated and narrow connection can also be obtained by closing the return bore by a small plug inserted under pressure inside said bore, said small plug being provided along its outer periphery with an elongated spirally wound groove having a narrow cross-section.

It is also possible to apply the principle of the invention to pumps and compressors wherein the operative chamber is closed by a diaphragm. In such a case, the diaphragm constituted by an elastic material would be clamped, say as illustrated at 15 between the sealing surfaces forming the joint 6. Said diaphragm would separate the driving liquid which lies underneath the diaphragm and is compressed by the plunger 2 from the liquid to be conveyed which lies above said diaphragm inside the valve-carrying head. The liquid to be compressed and the liquid to be conveyed may, if required, be constituted by two different media.

In such a case, the chamber 11 could be subjected to the pressure of the liquid to be conveyed, or else, to the action of the driving liquid as provided by suitable connections. This is irrelevant, since the pressures of the two fluids must be equal.

FIG. 2 illustrates some of the above mentioned variations. Inside the cylinder 1' moves a plunger 2' which is sealed through conventional means not shown in the drawing. Again on this cylinder 1' is seated a valve carrying head 3' provided with transverse bores 4' and 5' for suction and delivery valves which are not illustrated. The valve carrying head 3' is pressed against the cylinder 1' and seals along a narrow contact surface 6' with the mean sealing diameter 7'.

The sealing diameter 7' is now considerably larger than in the previous example of FIG. 1 because a membrane of elastic material 17 is inserted between cylinder and head, which separates the operating fluid from the fluid to be pumped. Instead of another cylinder 8 as in FIG. 1, now a longer flange 18 and another flange 19 together with tie rods 20 are used to hold cylinder 1' and valve head 3' together.

When the machine is operating, the pressure created by the plunger 2' is transmitted to a pipe 21 and a non-return valve 13' to a chamber 11' which in this example is located under the cylinder and therefore has an annular section. Again, according to the invention, the annular section 11' is larger than the pressure loaded diameter 7', so that an excess force is created by the operation of the machine itself, which will seal the cylinder 1' against the valve head 3', and at the same time tighten the tie rods 20. It is therefore not necessary to tighten the nuts of the tie rods 20 with considerable force when assembling the machine, because the excess tension is created automatically at once if the machine is operating. Because the annular surface 11' is slightly larger than the surface of the sealing diameter 7', the sealing pressure can be controlled so that it will have just the required value to make the seal fluid tight and will not be too high so that the compressing strength of the sealing material will not be exceeded. When the machine is stopped, the pressure in the chamber 11' will be slowly released through a capillary tube 22. Therefore, a short time after stopping the machine, the pressure will have disappeared and the tension in the tie rods will disappear simultaneously, so that the machine can be disassembled without effort.

It is understood that FIG. 1 and FIG. 2 are shown only as an example to explain how my invention can be realized. The features shown in these drawings may be used separately or in combination, and can of course be modified in their form.

What I claim is:

1. In a piston-controlled machine operating with a fluid under high pressure the combination comprising a cylinder, a valve-carrying head engaging an annular surface of said cylinder, an outer compressing piston to urge said valve-carrying head fluid tightly against said cylinder having a diameter larger than the diameter of said annular surface, a closing member fitted over said outer piston defining a chamber with said outer piston, and means feeding the pressure inside said cylinder to said chamber to urge said outer piston towards said cylinder and valve-carrying head system and thereby provide a sealing force between said cylinder and valve-carrying head which is proportional to the pressure prevailing inside the cylinder.

2. In a piston-controlled machine operating with a fluid under high pressure the combination comprising a cylinder, a valve-carrying head engaging an annular surface of said cylinder, an outer compressing piston to urge said valve-carrying head fluid tightly against said cylinder having a diameter larger than the diameter of said annular surface, a closing member fitted over said outer piston defining a chamber with said outer piston, means feeding the pressure inside said cylinder to said chamber to urge said outer piston towards said cylinder and valve-carrying head system and thereby provide a sealing force between said cylinder and valve-carrying head which is proportional to the pressure prevailing inside the cylinder and a non-return valve in last-mentioned means.

3. In a piston-controlled machine operating with a fluid under high pressure the combination comprising a cylinder, a valve-carrying head engaging an annular surface of said cylinder, an outer compressing piston to urge said valve-carrying head fluid tightly against said cylinder having a diameter larger than the diameter of said annular surface, a closing member fitted over said outer piston defining a chamber with said outer piston, means feeding the pressure inside said cylinder to said chamber to urge said outer piston towards said cylinder and valve-carrying head system and thereby provide a sealing force between said cylinder and valve-carrying head which is proportional to the pressure prevailing inside the cylinder and capillary means opening into said chamber between said cylinder and closing member to allow a slow emptying of said chamber.

4. In a piston-controlled machine operating with a fluid under high pressure the combination comprising a cylinder, a valve-carrying head engaging an annular surface of said cylinder, an outer compressing piston to urge said valve-carrying head fluid tightly against said cylinder having a diameter larger than the diameter of said annular surface, a closing member fitted over said outer piston defining a chamber with said outer piston, means feeding the pressure inside said cylinder to said chamber to urge said outer piston towards said cylinder and valve-carrying head system and thereby provide a sealing force between said cylinder and valve-carrying head which is proportional to the pressure prevailing inside the cylinder and a non-return valve fitted in last-mentioned means and provided with a narrow bore allowing a slow return of the fluid from said chamber into said cylinder.

References Cited by the Examiner

UNITED STATES PATENTS

| | | | |
|---|---|---|---|
| 520,349 | 5/94 | Zies | 230—230 |
| 839,331 | 12/06 | Stevens | 230—230 X |

LAURENCE V. EFNER, *Primary Examiner.*

WARREN E. COLEMAN, *Examiner.*